UNITED STATES PATENT OFFICE.

JOHN F. NEWELL, OF GARDINER, MAINE.

COMPOSITION FOR BEARINGS.

SPECIFICATION forming part of Letters Patent No. 494,156, dated March 28, 1893.

Application filed March 26, 1892. Serial No. 426,596. (No specimens.)

*To all whom it may concern:*

Be it known that I, JOHN F. NEWELL, a citizen of the United States of America, and a resident of the city of Gardiner, in the county of Kennebec and State of Maine, have invented a certain new and useful Improved Composition for Bearings of Journals, Spindles, &c., of which the following is a full, clear, and exact description.

My invention relates to an improvement in the composition of materials produced from comminuted plumbago, or graphite, and sundry fibers, minerals and oils, suitable for all frictional bearings such as bearings for journals, spindles, shafts, &c., and which not only shall be anti-frictional and a lubricant to the highest degree but also shall be most solid, compact, hard and durable.

To the end stated, this invention consists in a compound of plumbago, in a comminuted form, a fibrous substance preferably jute or linen pulp, white lead, red lead and linseed oil severally in the proportions and mixed and molded and otherwise prepared in the manner all substantially as hereinafter described.

A preferable compounding of the substances named is as follows:—Plumbago, comminuted, three parts; fibrous substance, three parts; white lead, one part; red lead, two parts; and linseed oil in sufficient quantity, as hereinafter appears. The invention however is not to be limited to these proportions.

The combined plumbago and fibrous substance—(a jute fiber being preferable)—should, for the best results, each be finely divided, and the plumbago in a pure condition, and they are, with the aid of water, thoroughly mixed and incorporated with each other and thus the particles of plumbago are intimately associated with and held by the fibers. The two leads are mixed with the linseed oil which is in sufficient quantity to reduce the whole to a more or less liquid condition and then the mixture of the leads and linseed oil and the mixture of the plumbago and fibrous substance are thoroughly mixed with each other, and the whole molded, under sufficient pressure to shape and to express the water, it is then dried until it is in a more or less tacky condition when it is again molded under a second and much heavier pressure and thereby rendered compact and hard and then finally dried under heat, the result being a most solid, compact and practically homogeneous molded form of plumbago permeated throughout with fiber and the leads and oil. The fibrous substance intimately connected with the particles of plumbago acts as a binder for the whole mass, while the red and white leads, and oil cement the fibers and particles of plumbago together and secure great hardness, solidity and compactness to the whole molded mass, and thus is produced a bearing for frictional surfaces such as journals, spindles, shafts, &c., which, in the highest degree, is anti-frictional and lubricant as also strong and durable.

Having thus described my invention, what I claim, and desire to secure by Letters Patent, is—

A molded and hardened composition of matter for bearings, &c., and consisting of plumbago, fibrous substance, red lead, white lead and a drying oil, substantially as described.

In testimony whereof I have hereunto set my hand in the presence of two subscribing witnesses.

JOHN F. NEWELL.

Witnesses:
ROBERT RICHARDS,
AMASA E. HARMON.